(12) United States Patent
Miele et al.

(10) Patent No.: US 11,691,508 B1
(45) Date of Patent: Jul. 4, 2023

(54) ELECTRIC POWER TAKE-OFF SYSTEM

(71) Applicant: Custom Truck One Source, Inc., Kansas City, MO (US)

(72) Inventors: Frank Miele, Kansas City, MO (US); Fred Ross, Jr., Kansas City, MO (US); Benjamin A. Link, Kearney, MO (US); Richard L. Smith, Overland Park, KS (US); Nathanael Quinn Armstrong, Kansas City, MO (US)

(73) Assignee: Custom Truck One Source, Inc., Kansas City, MO (US)

( * ) Notice: Subject to any disclaimer, the term of this patent is extended or adjusted under 35 U.S.C. 154(b) by 0 days.

(21) Appl. No.: 17/930,638

(22) Filed: Sep. 8, 2022

(51) Int. Cl.
*B60K 25/06* (2006.01)
*B60K 25/00* (2006.01)

(52) U.S. Cl.
CPC ........ *B60K 25/06* (2013.01); *B60K 2025/005* (2013.01); *B60K 2025/065* (2013.01); *Y02T 10/80* (2013.01)

(58) Field of Classification Search
CPC .............. B60K 25/06; B60K 2025/005; B60K 2025/065; Y02T 10/80
See application file for complete search history.

(56) References Cited

U.S. PATENT DOCUMENTS

| | | | | |
|---|---|---|---|---|
| 3,792,791 A * | 2/1974 | Fleming | ................ | E02F 9/2285 414/694 |
| 3,932,993 A * | 1/1976 | Riedhammer | .......... | F16H 61/46 60/449 |
| 6,073,428 A * | 6/2000 | Diekhans | ............... | B60K 25/00 123/352 |
| 6,928,358 B2 * | 8/2005 | Brooks | .................. | B60K 25/06 701/99 |

(Continued)

FOREIGN PATENT DOCUMENTS

| | | | | |
|---|---|---|---|---|
| WO | WO-2020187989 A1 * | 9/2020 | ............... | B60K 1/00 |
| WO | WO-2022132807 A1 * | 6/2022 | | |

OTHER PUBLICATIONS

Viatec—Press Release—Viatec Educates on the Impact of Idling, Introduces SMARTPTO, https://viatec.us/news/press-release/press-release-smartpto/, Oct. 9, 2018.

(Continued)

*Primary Examiner* — Jacob B Meyer
(74) *Attorney, Agent, or Firm* — Lathrop GPM LLP; Robert J. Lambrechts

(57) ABSTRACT

An electric power take-off system for mounting to a truck body to complement an existing power-take-off system powered by an internal combustion engine. The system includes a motor, a battery for providing electrical power to the motor, a fluid reservoir, a pump for pumping fluid through at least one hose from the fluid reservoir to at least one truck function and for return of the fluid to the reservoir.

(Continued)

The system also includes a system interlock rendering inoperable the electric power-take-off system when the internal combustion engine is in operation and a motor controller in communication with the motor for controlling the power output of the motor. The system also includes a charging unit for charging of the battery and a data management system operable to collect data.

20 Claims, 2 Drawing Sheets

(56) References Cited

U.S. PATENT DOCUMENTS

| | | | | |
|---|---|---|---|---|
| 6,963,796 | B2* | 11/2005 | Larson | B60R 16/03 |
| | | | | 701/69 |
| 7,165,639 | B2* | 1/2007 | Delaney | F15B 21/085 |
| | | | | 180/165 |
| 7,281,595 | B2* | 10/2007 | Bissontz | B60W 10/02 |
| | | | | 180/65.285 |
| 7,641,018 | B2* | 1/2010 | Bissontz | B60W 10/08 |
| | | | | 180/65.265 |
| 8,103,395 | B2* | 1/2012 | Bissontz | B60W 20/10 |
| | | | | 180/164 |
| 8,489,254 | B2* | 7/2013 | Bissontz | B60W 10/06 |
| | | | | 701/2 |
| 8,639,403 | B2* | 1/2014 | Books | B60W 10/06 |
| | | | | 701/1 |
| 8,818,588 | B2 | 8/2014 | Ambrosio et al. | |
| 8,838,314 | B2* | 9/2014 | Bissontz | B66F 11/044 |
| | | | | 701/55 |
| 8,972,084 | B2* | 3/2015 | Bissontz | B60K 28/165 |
| | | | | 180/165 |
| 9,170,081 | B2* | 10/2015 | Rudinec | B60L 7/14 |
| 9,187,100 | B2* | 11/2015 | Books | B60W 10/08 |
| 10,933,743 | B2* | 3/2021 | Singh | F16H 3/727 |
| 11,167,919 | B1 | 11/2021 | Koga et al. | |
| 11,203,262 | B2 | 12/2021 | Schumacher et al. | |
| 2004/0103656 | A1* | 6/2004 | Frazer | F15B 21/14 |
| | | | | 60/414 |
| 2004/0148917 | A1* | 8/2004 | Eastwood | A01D 75/306 |
| | | | | 56/6 |
| 2006/0197375 | A1* | 9/2006 | Delaney | B60K 17/356 |
| | | | | 303/20 |
| 2007/0135257 | A1* | 6/2007 | Bissontz | B60L 1/003 |
| | | | | 477/5 |
| 2008/0060857 | A1* | 3/2008 | Knestrick | B60W 10/30 |
| | | | | 180/53.4 |
| 2009/0044993 | A1* | 2/2009 | Bissontz | B60L 1/003 |
| | | | | 180/65.265 |
| 2009/0076690 | A1* | 3/2009 | Guo | B60W 20/20 |
| | | | | 180/165 |
| 2009/0236156 | A1* | 9/2009 | Promersberger | H01M 16/006 |
| | | | | 429/418 |
| 2010/0078234 | A1* | 4/2010 | Bissontz | B60K 17/28 |
| | | | | 180/65.24 |
| 2011/0231046 | A1* | 9/2011 | Bissontz | B60K 6/48 |
| | | | | 180/65.265 |
| 2013/0000295 | A1 | 1/2013 | Bissontz et al. | |
| 2014/0165963 | A1* | 6/2014 | Langham | F02B 71/04 |
| | | | | 123/363 |
| 2014/0219848 | A1* | 8/2014 | Rabhi | F03C 1/047 |
| | | | | 418/24 |
| 2022/0105807 | A1 | 4/2022 | Schumacher et al. | |
| 2022/0118854 | A1 | 4/2022 | Davis et al. | |

OTHER PUBLICATIONS

Ampeater, Electric Tractor w/ E-PTO for accessories, https://hackaday.io/project/10009-electric-tractor-w-e-PTO-for-accessories, Mar. 5, 2016.

Viatec—Plum, The New Generation of ePTO. The Big Difference, https://viatec.us/news/the-new-generation-of-epto-the-big-difference/, Sep. 15, 2019.

Altec—JEMS, Plug-In Technology for Reducing Jobsite Engine Idle, https://www.altec.com/site/uploads/JEMS-SELEIit_1520279042, Atec, 2019.

Jouffrey et al., Electric Power Take-Off Heralds a Revolution in Mobile Machinery, https://www.electronicspecifier.com/industries/industrial/electric-power-take-off-heralds-a-revolution-in-mobile-machinery, Oct. 2, 2020.

Odyne, Operation/Maintenance G2V2 manual ePTO Only, http://odynesupport.com/odyne/odscontent/manuals/120814OdyneOperMaintManualRev3eptoonly.pdf, 2014.

Sickels, Bergstrom, Viatec Partner to Provide Package of No-Idle Options for Utility Trucks, https://www.fleetequipmentmag.com/bergstrom-viatec-partner-no-idle-options/, Oct. 8, 2019.

Ban, Electric Multipurpose Vehicle Power Take-Off: Overview, Load Cycles and Actuation via Synchronous Reluctance Machine, https://www.researchgate.net/profile/Branko-Ban/publication/339481984_Electric_Multipurpose_Vehicle_Power_Take-Off_Overview_Load_Cycles_and_Actuation_via_Synchronous_Reluctance_Machine/.

SKYLIFT MD6000 E-Series Benefits and Key Specs.

\* cited by examiner

ELECTRIC POWER TAKE-OFF SYSTEM

FIELD OF THE DISCLOSURE

A system for electrically powering auxiliary functions or equipment on vehicles that include sourced power from an internal combustion engine.

BACKGROUND

Power take-off (PTO) is a device that transfers an engine's mechanical power to another piece of equipment. A PTO allows the hosting energy source to transmit power to additional equipment that does not have its own engine or motor. For example, a PTO helps to power a hydraulic cylinder by using a truck engine to provide rotary power to a pump that pressurizes the hydraulic fluid for movement of the hydraulic cylinder. PTOs are commonly used in commercial and industrial trucks as well as farming equipment.

PTO's have been around for many decades. Experimental versions were invented as early as 1878, while even before then there were other ways to transfer power from a running engine. Before the modern PTO, either the engine remained stationary, or the device only worked while the vehicle (in most cases a tractor) was actively moving and was typically attached to the wheel. It was not until the first true PTO was invented, that it was possible to proficiently utilize a drive train to operate equipment that did not slip, was easily connected, and disconnected, and operated while the vehicle was making turns. It was these motivations that brought about the first ever commercial PTO.

To power ancillary systems on, for example, a boom truck, the vehicle must be fitted with an extra means of a power supply, a Power Take-Off (PTO). In most cases, the PTO will connect directly to a hydraulic pump. This allows for transmission of mechanical force through the hydraulic fluid system to any location around the vehicle where a hydraulic motor or cylinder will convert it back into rotary or linear mechanical force.

Power demand varies enormously, depending on the type of application from a few horsepower up to 80 horsepower and even more in certain applications with torque output varying from a few hundred ft-lbs to well over 1,000 ft-lbs. Power demands also vary by the same application. A refuse truck, for example, requires little power for loading in contrast to the high load required to drive the compactor.

Historically, the PTO output shaft has been a part of the Internal Combustion Engine or transmission, which requires the engine to be idling during use or in some applications additional rotational speed from the engine is required to provide increased PTO power output. An idling engine can produce up to twice as many exhaust emissions as an engine required to power a truck in motion. Exhaust emissions contain a range of air pollutants such as carbon monoxide, nitrogen dioxide, and particulate matter. These can affect the air quality of the surrounding environment. Idling vehicles, especially diesel trucks, also contribute to noise pollution, typically when power demand is high.

SUMMARY OF THE INVENTION

A PTO is any of several methods for taking power from a vehicle's running engine, and transmitting it to an auxiliary application, like the hydraulics for an aerial platform lift. These units most commonly transfer energy via the spinning drive shaft of the vehicle they serve, so to operate the bucket, a utility truck's engine must remain idling to supply power to the arm. This accounts for literally millions of hours of idling worldwide, on an annual basis.

A single bucket truck from a power company may idle for thousands of hours a year while operating the bucket lift attached to it. Without ever moving, the truck will idle long enough to account for nearly 70% of its total maintenance cost, will combust nearly 2,000 gallons of fuel, and release almost 40,000 pounds of carbon dioxide into the atmosphere. According to the U.S. Department of Energy, 6 billion gallons of diesel fuel and gasoline are wasted by idling vehicles each year.

This level of operation is enough to drastically affect the life of the truck and its overall resale value. During operation, the noise from the diesel engine will make verbal communication between onsite personnel nearly impossible. Exposure to noise, which idling contributes to, has been demonstrated to cause hypertension and gastrointestinal changes, and has been linked to aggression. Consequently, reducing exposure to noise levels is important for maintaining the health of the workforce. Medium- and heavy trucks cause noise peaks ranging from 73-85 decibels. With the installation of the electric Power Take-Off (ePTO) system, noise levels are shown to be reduced by as much as 80%.

To further complicate matters for those using commercial vehicles with traditional PTOs, as of October 2021, eighteen states had passed legislation restricting commercial vehicle idling. Additionally, dozens of cities and counties have passed ordinances and regulations restricting vehicle idling, to include 39 cities and 10 counties in Texas alone. The most stringent of these regulations and ordinances, for example, impose limitations upon idling of no more than 5 minutes in any 60-minute period with penalties of up to $25,000 [Sacramento City Code, Title 8, Ch. 8.116] and the potential for imprisonment for up to 90 days for multiple violations of the idling limitation [see Code of City of New Rochelle, N.Y., Part II, Ch. 312, Art II. § 312-68].

The state of California has implemented a program known as Hybrid and Zero-Emission Truck and Bus Voucher Incentive Project (HVIP) which plays a crucial role in the deployment of zero-emission and near-zero emission technologies. HVIP accelerates commercialization by providing point-of-sale vouchers to make advanced vehicles more affordable. Both public and private operators of medium- and heavy-duty trucks and bus fleets are eligible for rebates. HVIP benefits the residents of California by stimulating deployment of advanced clean commercial vehicles, reducing greenhouse gas emissions to help meet longer term climate goals, and improving community health with immediate air pollution emission reductions.

HVIP responds to a key market challenge by making clean trucks and buses more affordable for fleets. Fleets receive the voucher discount at the point of sale and HVIP-approved dealers process the required documentation. These Dealers are responsible for requesting a voucher on behalf of a customer at the point of purchase when funds are available.

The HVIP technical program requirements are that an ePTO use alternating current (AC) to power the electric motor and have a voltage of at least 40 volts. The California HVIP program also requires that the vehicle must include a telematics device that electronically tracks (i) vehicle location, (ii) time of operation in ePTO mode, (iii) telematics data for SB 535 Disadvantage Communities (DACs): All work vehicles with ePTO are to be equipped with a data acquisition system capable of collecting vehicle GPS data. The ePTO system 10 as disclosed herein satisfies the requirements of the HVIP program.

With the increased emphasis on reducing air pollution and engine noise, government legislation is pushing towards the use of electric power to drive ancillaries in work trucks. This is particularly relevant in utility line maintenance/installation and construction applications operating in urban areas. Adopting ePTO systems as an alternative to the traditional PTO from an internal combustion engine brings multiple benefits to the application, the operator, and the environment. Historically, the PTO output shaft has been part of the internal combustion engine or transmission, which requires the engine to be idling during use. An idling engine can produce up to twice as much exhaust emissions as an engine that is powering a moving truck.

ePTO makes the vehicle environmentally friendly and is the first step towards hybrid and all-electric powertrains. Decoupling the auxiliary functions from the internal combustion engine allows independence from the speed of the diesel engine, ensuring work is carried out in the best yield zone with higher efficiency and less fuel consumption. The reasons for this development are clear. The strengthening of environmental rules for fine-particle and noise emissions and the constraints imposed by contractors for urban worksites increases the sense of urgency.

The ePTO system disclosed herein solves these problems. The ePTO as disclosed herein is quieter and safer than the traditional internal combustion engine driven PTOs so that ground crews can communicate freely. Moreover, modernized lithium-ion batteries cost $5,000 on average and weigh considerably less, at around 50 kg, as compared to earlier much heavier and costlier variants. ePTOs can quickly be deactivated to restore operation of the traditional internal combustion engine driven PTO at any time during operation. The ePTO system as disclosed herein is easily transferable from one truck to another within a few hours because rather than being powered by the drivetrain of the vehicle, the ePTO system plugs directly into the hydraulic system, improving efficiency and making it easier than ever to retrofit existing fleets. This creates a return on investment of typically less than 4-5 years.

Onboard telemetry software for the disclosed ePTO system provides for tracking, diagnosis, and delivery of raw data from the field, pushing updates and performance adjustments remotely. Most truck installations achieve nearly $80,000 in lifetime savings per system and reduce maintenance costs by about 70%.

Added benefits of the diesel engine can be a smaller footprint and fuel consumption savings. For example, when parked for operational reasons, the diesel engine can be switched off and the ePTO can be used. As a result, the reduced noise at the work site improves communication and therefore safety. The primary function of the diesel engine can be for transportation and not to power equipment thereby reducing engine run time and maintenance downtime and costs.

The ePTO system consists of a motor controller and an electric motor powered by a DC power source, generally a battery pack. Running auxiliary loads from the battery removes the need to idle the engine during PTO usage, which reduces fuel consumption, thereby eliminating air and noise pollution. Like a standard PTO, the ePTO motor can be connected to a hydraulic pump for moving the hydraulic fluid to drive, for example, a hydraulic cylinder or a hydraulic rotary motor. This ePTO configuration creates new opportunities for further improvements in efficiency and noise reduction.

There are several solutions to power the ePTO. The first is using a rechargeable battery, which has the capacity to complete a day's work and can be recharged overnight, benefitting from lower energy prices, or using 'green' energy. Alternatively, the battery can be charged using a generator, which is driven by the internal combustion engine. This solution is most suited to stop-start applications, such as a boom truck. Because the battery can be regularly recharged, its size and weight are reduced.

In most cases, the PTO will connect directly to a hydraulic pump. This allows for transmission of mechanical force through the hydraulic fluid system to any location around the vehicle where a hydraulic motor or cylinder will convert it back into rotary or linear mechanical force. Power demand varies enormously, depending on the type of application from a few kilowatts to several tens of kilowatts. It can also vary on the same application. A boom truck, for example, requires modest power output from the motor/pump combination for extending the hydraulic cylinders and operating the boom rotary motor but otherwise power demands are either very limited or non-existent.

Various objects, features, aspects, and advantages of the disclosed subject matter will become more apparent from the following detailed description of preferred embodiments, along with the accompanying drawings in which like numerals represent like components. The contents of this summary section are provided only as a simplified introduction to the disclosure and are not intended to be used to limit the scope of the appended claims.

The contents of this summary section are provided only as a simplified introduction to the disclosure and are not intended to be used to limit the scope of the appended claims.

DETAILED DESCRIPTION

Figure 1:
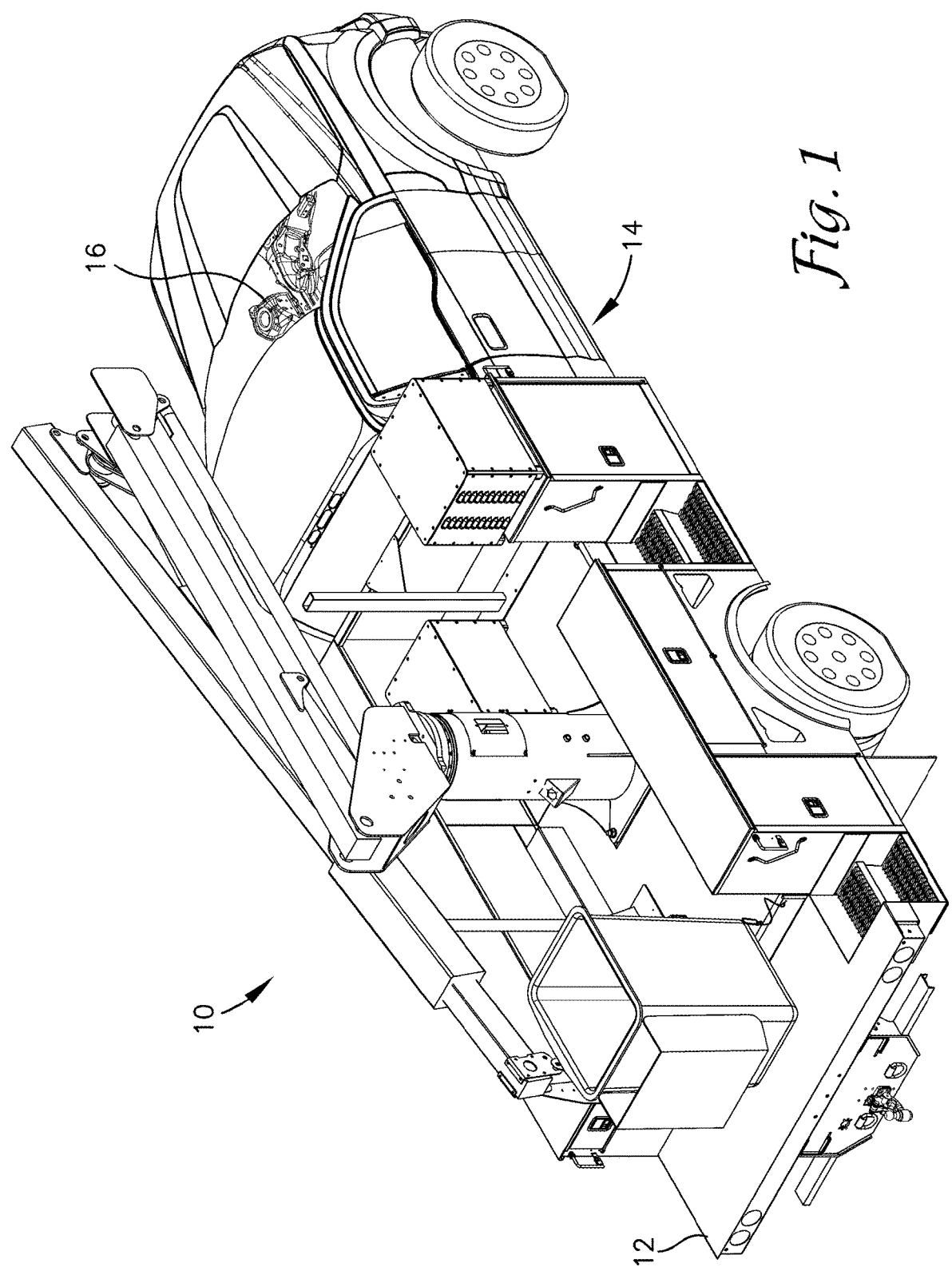
FIG. 1 illustrates an exemplary boom truck fitted with both a standard PTO driven by an internal combustion engine and an ePTO system.

Disclosed herein as illustrated at FIG. 1 is an electric power-take-off (ePTO) system 10 for mounting to a truck body 12 to complement a truck body mounted Power Take-Off system 14 driven by an internal combustion engine 16. The truck body illustrated at FIG. 1 should not be construed as limiting this system to only the depicted configuration of truck body. The system as disclosed herein is applicable to a wide range of truck body configurations and truck body functionality. As will be discussed in greater detail below, the modularity of the ePTO system is one of the great strengths of the system as disclosed herein and permits the various functional elements of the system to be positioned in an infinite number of locations upon the truck body due to the capability to mount components, flexible hydraulic lines and flexible cabling to many locations upon the truck body without diminishing the functionality of effectiveness of the system 10.

Figure 2:
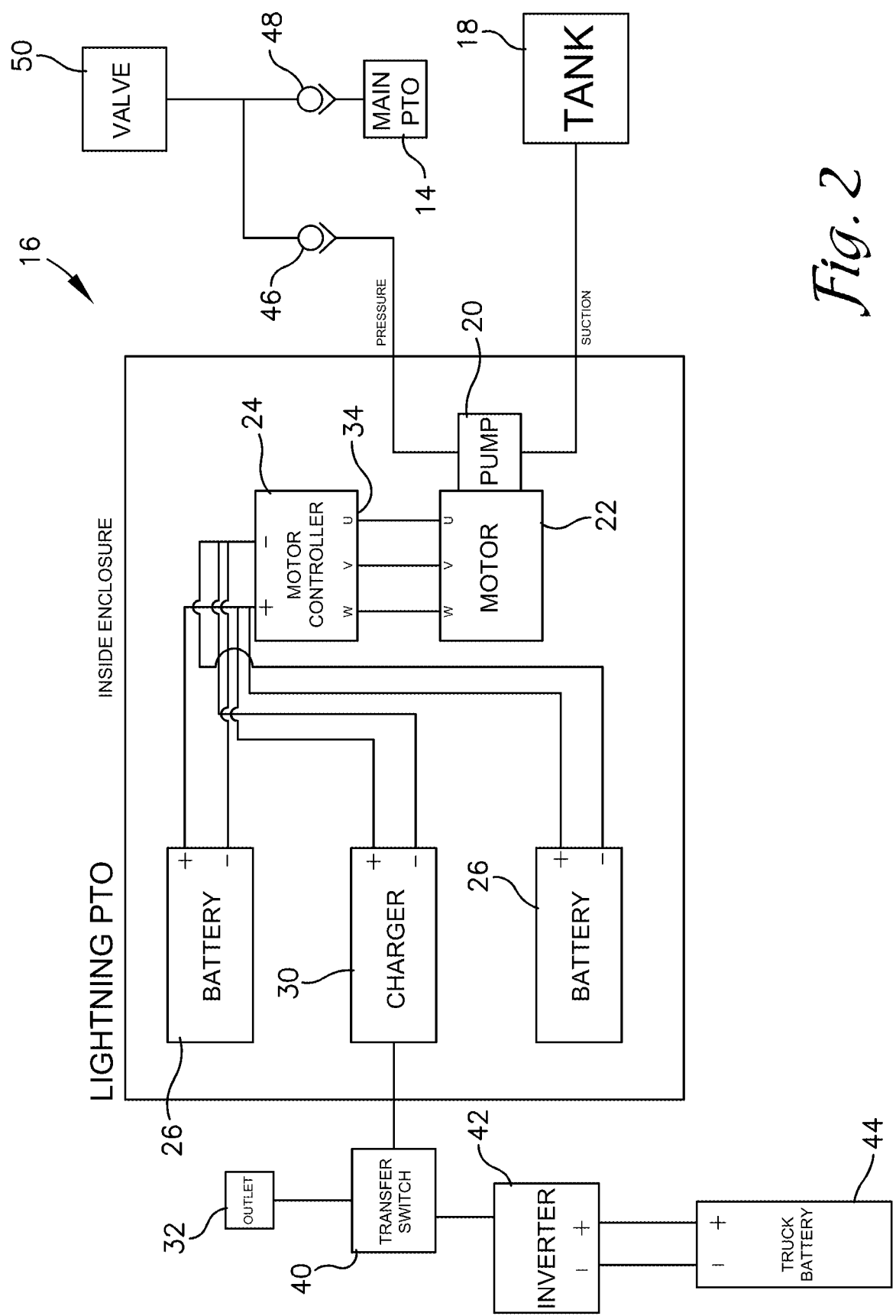
FIG. 2 illustrates a schematic of the ePTO system.

As seen in FIG. 2, the system 10 includes a reservoir tank 18 for holding a quantity of fluid. An exemplary fluid is a hydraulic fluid such as Shell® Tellus S2 MX 46, however, other similar fluids would also be appropriate for this application. The fluid in this tank 18 is pumped through both rigid and flexible lines to both the internal combustion engine 16 driven PTO system 14 and the ePTO system 10. The tank 18 may be mounted at any location upon the truck body 12 that is operationally appropriate.

The disclosed system 10 as illustrated in FIG. 2 includes a pump 20 for suctioning fluid from the reservoir tank 18 for dispersal to both the ePTO system 10 and the PTO system 14 driven by the internal combustion engine 16. The pump 20, driven by an electric motor 22, is preferably a gear pump that is capable of operating at a pressure of about 3,000 psi with a maximum speed of 3,400 rpm. Exemplary pumps for this type of an application are the 'C' series pumps manufactured by GearTek® of Corinth, Miss.; however other brands of pumps would be equally suitable.

The electric motor 22 driving the pump 20 is preferably a 3-phase variable frequency induction motor and exemplary motors for this type of application are manufactured by ABM®; however, other brands of comparable motors would be appropriate. The electric motor 22 drives the pump 20 using a round shaft that may be splined or alternatively include a shaft flat for appropriate connection to drive the pump 20.

Because the operation of the electric motor 22 is critical to appropriate operation of the ePTO system 10, the motor operation is directed by a motor controller 24. The motor controller 24 is a power electronic device that changes the direct current (DC) to alternating current (AC) and produces a pure sine wave that can be used to reliably provide the requisite AC power to the electric motor 22. An exemplary model No. M17 motor controller is available from Innovative Fluid Power of Cedar Rapids, Iowa; however, other brands of motor controllers would be appropriate for this application.

The motor controller 24 is configured to limit operation of the ePTO motor 22 only to occasions of truck function operation initiated by the system operator. Control of the motor 22 by the motor controller is delivered by means of three leads 34 (W,V,U) from the motor controller 24 to the motor 22. The truck functions include, among others, the extension or retraction of outriggers and boom sections, the use of hydraulically operated tools, the activation of hydraulically driven motors that are utilized to rotate the boom arm attached to a bucket or platform. Until an operator seeks to activate a truck function, i.e., outrigger, boom, etc., the motor does not drive the pump and does not utilize electrical power.

The electrical power that drives the electric motor 22 after inversion, by the motor controller, from direct current to alternating current is provided by a battery pack 26 secured to the truck body 12. The battery pack 26 provides a reliable source of direct current (DC) to the motor controller 24 for conversion to alternating current (AC). An exemplary lithium-ion battery pack 26 is available from Vanguard® Commercial Power of Wauwatosa, Wis.

The Vanguard® battery pack 26, for example, is designed as a durable integrated battery system with a power output of 5 kWh, a top voltage of 57.4 volts, a nominal voltage of 50.4 volts and a capacity at maximum discharge of 90 Ah. The battery pack 26 is configured to receive a charger input power of 120 volts at 60 Hz or 220 volts at 50 Hz and requires a charge time of 6 hours. The battery pack 26 may be secured to the truck body 12 per standard industrial attachment means that are well known.

The operation of the electric motor 22 and pump 20 are limited only to occasions of truck function operation initiated by the system operator. As indicated above, truck functions include the extension and retraction of outriggers and booms, the use of hydraulically operated tools, and the activation of hydraulically driven motors that are utilized to rotate the boom arm attached to a bucket or platform, among others.

The ePTO system 10 also utilizes a charging unit 30 that recharges the battery pack 26 through an outlet 32. Shore power plugged into the outlet 32 may be utilized to recharge the battery pack 26 when the truck body 12 has been parked, for example, overnight or alternatively when the truck body 12 is in transit and the charging system integral to the internal combustion engine electrical system is operating. An exemplary 1,050 W charging unit 30 is available from Vanguard® Commercial Power of Wauwatosa, Wis.

A source of electrical power generated by operation of the internal combustion engine 16 is operable to provide electrical current to the charging unit 30 for charging of the battery pack 26 only when the truck body 12 is fully configured for transit. The truck body 12 is fully configured for transit when all truck function safety interlocks (not shown) are engaged, and the truck body parking brake is released.

The truck function safety interlocks are engaged when all truck functions, i.e., outriggers, boom sections, etc., are in a fully stowed position as determined by limit switches, proximity switches or functionally similar sensing devices that may be located at numerous locations upon the truck body and associated equipment to confirm placement of powered equipment. These limit or proximity switches are placed in locations upon the truck body and ancillary equipment mounted to the truck based upon the configuration. All outriggers have micro-switches sensing the location of the fully deployed outriggers. Once the transmission control module (TCM) senses that all four outriggers have been deployed, the TCM sends a 12V signal to the rear hydraulic dump valve, allowing fluid to support boom functions. Not until all outriggers are stowed and stowage is confirmed by the micro-switches will the TCM permit the transmission to go into gear for transit.

The truck function is only operable when the operator releases a safety interlock 42 and simultaneously activates a control valve 44 to provide delivery of fluid to the specified truck function. This means that a human operator must actively initiate two separate switches to initiate a truck function—a requirement that substantially increases operational safety.

The system 10 as illustrated at FIG. 2 requires that if the engine is running and the PTO switch is activated in the truck cab then the transmission mounted PTO has priority. If the engine is not running, then the ePTO has priority. If the engine is not operating and the ePTO is off, then the emergency pump has priority.

Because of the modularity of the ePTO system 10, the truck body 12 and equipment mounted to the truck body are configured with quick disconnect fittings for both electrical and hydraulic connections 50, 52 as illustrated at FIG. 3. These quick disconnect fittings and electrical components are particularly beneficial when rapid changeout of the configuration of the equipment mounted to the truck body 12 is desired or a malfunctioning system 10 must be replaced.

Because of the high degree of modularity, the ePTO system 10 can readily be ported to another truck, or a malfunctioning system 10 can rapidly be replaced with a fully operational ePTO system 10. To further improve the modularity of the system 10, a preferred embodiment utilizes quick-disconnect hydraulic hose fittings, wiring harnesses and cabling configured to quickly disengage the electric power-take-off system from the truck body. No specialized tools, only manual dexterity and basic tools need be employed to disconnect/connect the hydraulic line or electrical connection from the truck body. Industry standard hydraulic quick disconnect fittings and wiring harnesses are well known in the art and are preferably employed with this ePTO system 10 to improve ease of changeout.

The ePTO system 10 also incorporates a data management system that is operable to collect data on at least one of (i) hours of operation of the electric power-take-off system, (ii) hours of operation of the existing power-take-off system powered by the internal combustion engine, (iii) fuel savings resulting from increased usage of the electric power-take-off system and reduced usage of the internal combustion engine, and (iv) calculated reduction of greenhouse gas emissions from increased usage of the electric power-take-off system and reduced usage of the existing power-take-off system.

That data that is collected by the ePTO system 10 to include data from the batteries as well as the motor controller is transmitted via a controller area network (CAN) by at least one of 2G, 3G, 4G and 5G to the telematics receiver where it may then be routed to a central repository for analysis and then optionally for use in fleet life-cycle management software. The CAN bus is ideally suited to a high-level industrial protocol embracing ISO-11898:2003 as their physical layer. CAN's cost, performance, and upgradeability provide for tremendous flexibility in system design. Bluetooth functionality is also built into the system 10 to facilitate maintenance and repairs on the system 10 should there be a malfunction.

Lifecycle management software, as mentioned above, refers to the decisions a fleet owner makes to get the most value out of its vehicles. It includes everything from the cost of buying the vehicle, the cost of insurance and maintenance, and the price of selling it once the fleet is done with it. The best fleet vehicle is efficient, safe, and holds its value. Fleets will save more money with every year they utilize lifecycle management software that relies upon data provided by the system 10 as disclosed herein. With the real-time data available from the system 10 as disclosed herein, lifecycle management software can assess (i) when a fleet owner should sell an older vehicle and purchase a new one, and (ii) optimize repair costs.

Any fleet will benefit from lifecycle management software that utilizes the data provided by the system 10 as disclosed herein. By collecting data to include (i) hours of operation of the electric power-take-off system, (ii) hours of operation of the existing power-take-off system powered by the internal combustion engine, (iii) fuel savings resulting from increased usage of the electric power-take-off system and reduced usage of the internal combustion engine, and (iv) calculated reduction of greenhouse gas emissions from increased usage of the electric power-take-off system and reduced usage of the existing power-take-off system, allows a fleet owner to timely schedule maintenance and replace vehicles at the end of their optimal lifecycle, minimizing the need for costly maintenance.

In operation, the ePTO system 10 components are assembled and interconnected on the truck body 12 to provide identical functionality to that achieved by the PTO powered by the truck's internal combustion engine but without the emissions from the engine or the high levels of engine sound. The truck body 12 utilizes a system interlock rendering inoperable the electric power-take-off system when the internal combustion engine is in operation. A PTO pressure switch (not shown) provides the signal to sense the operation of the engine. The PTO pressure switch is active only if the engine is running and the PTO switch is in the "ON" position.

Another innovative feature of the ePTO system 10 as disclosed herein is the purposefully limited operation of the ePTO motor 22 and pump 20. This is a critical feature of the ePTO system 10 allowing the system to maximize the functional charge of the battery pack 26 by withdrawing current from the battery pack 26 to operate the motor 22 and pump 20 only when there is a truck function demand placed upon the motor 22. The motor 22 and pump 20 of the ePTO system 10 do not move fluid to a truck function until the operator releases a safety interlock (not shown) and simultaneously activates a control valve (not shown) to provide delivery of fluid to the truck function. Only when an operator, for example, seeks to extend a boom or retract an outrigger will she engage the safety interlock and activate the control valve thereby allowing current to flow from the battery pack 26 through the motor controller 24 to the motor 22 thereby rotating the pump 20 that pushes the fluid through the hydraulic lines to extend or retract the boom, outrigger or operate a hydraulic tool.

The system as disclosed herein, and as illustrated at FIG. 2, includes a transfer switch 40 that is operable to select only the first source of supplied electrical power from either an inverter 42 or the outlet 32 for delivery of electrical current to the charger 30. If the two sources of electrical power, (i) inverted power from the truck battery 44, and (ii) external power from the outlet 32 are inadvertently simultaneously supplied to the transfer switch 40, the transfer switch will automatically select only the first source of supplied electrical power for delivery to the charger. This transfer switch 40 safety feature prevents the delivery of 220-240 volts to the charger 30 and potential damage to the charger.

Another feature of the system as disclosed herein and as illustrated at FIG. 2, is the use of first and second check valves 46, 48. The check valves 46, 48 operate without human intervention depending upon whether the power-take-off system powered by an internal combustion engine or the electrical power-take-off system is in operation. If the electrical power-take-off system is operating, then the second check valve 48 closes thereby preventing the flow of fluid into the power-take-off system powered by an internal combustion engine and the fluid moves toward a manually controlled valve 50 for delivery to a truck function as directed by a human operator.

If the power-take-off system powered by an internal combustion engine is operating, then the first check valve 46 closes thereby preventing the flow of fluid into the electrical power-take-off system and the fluid moves toward the manually controlled valve 50 for delivery to a truck function as directed by a human operator.

The system as disclosed herein is also highly modular and repositionable upon the truck body. Because the battery pack, motor controller, motor and pump may be either located compactly near one another or separated to accommodate space limitations on the truck body. The system as disclosed herein can meet all operational requirements of the truck as designed. In addition, should a component, such as the pump need replacement, but a spare ePTO pump has not yet arrived, the truck engine powered PTO is still operable to satisfy mission requirements.

The modularity of the disclosed system also means that should additional critical equipment require space on the truck that is presently occupied by ePTO equipment, the ePTO equipment can be readily repositioned to make space for the new critical equipment. Increased length hydraulic lines and cabling can either be substituted for hoses and cabling that is too short to accommodate the move or longer hoses and cabling can be pre-packaged into the original unit should there be a need to make changes on the fly.

The substantial modularity of the ePTO equipment will also mean that repairs will likely be less costly from a labor perspective as the ePTO equipment will be positioned in such a manner to lessen complications for accessing critical components requiring repairs as compared to transmission driven PTO units that require working under the truck in many instances.

The disclosed system should not be construed as limiting in any way. Instead, the present disclosure is directed toward all novel and nonobvious features and aspects of the various disclosed embodiments, alone and in various combinations and sub-combinations with one another. The disclosed apparatus and systems are not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. We therefore claim as our invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching may be used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. An electric power take-off system for mounting to a truck body to complement an existing power-take-off system powered by an internal combustion engine, the system comprising:
   a motor with an output shaft;
   at least one battery for providing electrical power to the motor;
   a fluid reservoir;
   a pump operably connected to the output shaft of the motor for pumping fluid through at least one hose from the fluid reservoir to at least one truck function and for return of the fluid to the reservoir;
   a selector to engage or disengage the existing power-take-off system;
   a system interlock rendering inoperable the electric power-take-off system when the internal combustion engine is in operation;

a motor controller in communication with the motor for controlling the power output of the motor, wherein the motor controller limits operation of the motor only to occasions of truck function operation initiated by the system operator;

a charging unit for charging of the at least one battery, the charging unit comprising at least one outlet and a charging interlock, wherein the charging interlock prevents charging of the at least one battery until all safety interlocks are engaged and the truck body is configured for transit;

at least one quick-disconnect hose fitting configured to disengage the electric power-take-off system at least one hose from the truck body;

at least one of (i) a wiring harness, and (ii) a cable operable for quick disconnect of electrical wiring connecting the electric power-take-off system to the truck body; and a data management system operable to collect data on at least one of (i) hours of operation of the electric power-take-off system, (ii) hours of operation of the existing power-take-off system powered by the internal combustion engine, (iii) fuel savings resulting from increased usage of the electric power-take-off system and reduced usage of the internal combustion engine, and (iv) calculated reduction of greenhouse gas emissions from increased usage of the electric power-take-off system and reduced usage of the existing power-take-off system, wherein the data management system is operable to wirelessly transmit data via a controller area network by at least one of 2G, 3G, 4G or 5G from the system to a server for transmission to a customer.

2. The system of claim 1, wherein the electric power-take-off system is compliant with the California Hybrid and Zero-Emission Truck and Bus Voucher Incentive Program.

3. The system of claim 1, wherein the electric power-take-off system facilitates compliance with California Code Regulation, Title 13, section 2485 titled Airborne Toxic Control Measure to Limit Diesel Fueled Commercial Motor Vehicle Idling, wherein operation of the power-take-off system powered by the internal combustion engine may be significantly curtailed.

4. The system of claim 1, wherein the truck function is at least one of (i) outriggers, (ii) hydraulic cylinders, (iii) hydraulically operated tools, and (iv) hydraulically driven motors.

5. The system of claim 1, wherein the electric power-take-off system components are modular, separable and repositionable upon the truck body.

6. The system of claim 1, wherein the noise level of the electric power-take-off system is roughly 85% less than the noise level of the existing power-take-off system powered by an internal combustion engine.

7. The system of claim 1, wherein the selector is operable from a control panel mounted to the truck body.

8. The system of claim 1, wherein the selector is operable from a lift bucket.

9. The system of claim 1, wherein an electrical power source powered by the internal combustion engine is operable to provide electrical current to the charging unit for charging of the at least one battery only when the truck body is fully configured for transit.

10. The system of claim 1, wherein the truck function is operable when the operator releases a safety interlock and simultaneously activates a control valve to provide delivery of fluid to the truck function.

11. The system of claim 1, wherein the outlet is operable only to receive electrical current from a source external to the truck body for charging of the at least one battery.

12. The system of claim 1, wherein a transfer switch is operable to select only the first source of supplied electrical power from either an inverter or the outlet for delivery to the charger.

13. The system of claim 12, wherein the transfer switch automatically limits the electrical power sent to the charger to no greater than that supplied by the outlet or the inverter.

14. The system of claim 13, wherein the inverter receives electrical power from a truck battery.

15. The system of claim 1, wherein a first check valve prevents return flow of fluid to the existing power-take-off system powered by an internal combustion engine when the electric power-take-off system is in operation.

16. The system of claim 15, wherein a second check valve prevents return flow of fluid to the electric power-take-off system when the existing power-take-off system powered by an internal combustion engine is in operation.

17. An electric power take-off system for mounting to a truck body, the system comprising:

a motor with an output shaft;

at least one battery for providing electrical power to the motor;

a fluid reservoir;

a pump operably connected to the motor for pumping fluid through at least one hose from the fluid reservoir to at least one truck function and for return of the fluid to the reservoir;

a selector to engage or disengage the existing power-take-off system;

a motor controller in communication with the motor for controlling the power output of the motor, wherein the motor controller limits operation of the motor only to occasions of truck function operation initiated by the system operator;

a charging unit for charging of the at least one battery, the charging unit comprising at least one outlet and a charging interlock, wherein the charging interlock prevents charging of the at least one battery until all safety interlocks are engaged and the truck body is configured for transit;

at least one quick-disconnect hose fitting configured to disengage the electric power-take-off system at least one hose from the truck body;

at least one of (i) a wiring harness, and (ii) a cable operable for quick disconnect of electrical wiring connecting the electric power-take-off system to the truck body; and a data management system operable to collect data on at least one of (i) hours of operation of the electric power-take-off system, (ii) hours of operation of the existing power-take-off system powered by the internal combustion engine, (iii) fuel savings resulting from increased usage of the electric power-take-off system and reduced usage of the internal combustion engine, and (iv) calculated reduction of greenhouse gas emissions from increased usage of the electric power-take-off system and reduced usage of the existing power-take-off system, wherein the data management system is operable to wirelessly transmit data from the system to a server for transmission to a customer.

18. An electric power take-off system for mounting to a truck body to complement an existing power-take-off system powered by an internal combustion engine, the system comprising:

a motor with an output shaft;

at least one battery for providing electrical power to the motor;

a fluid reservoir;

a pump operably connected to the output shaft of the motor for pumping fluid through at least one hose from the fluid reservoir to at least one truck function and for return of the fluid to the reservoir;

a selector to engage or disengage the existing power-take-off system;

a system interlock rendering inoperable the electric power-take-off system when the internal combustion engine is in operation;

a motor controller in communication with the motor for controlling the power output of the motor to only on-demand occasions of truck function operation initiated by the system operator;

a charging unit for charging of the at least one battery, the charging unit comprising at least one outlet and a charging interlock, wherein the charging interlock prevents charging of the at least one battery until all safety interlocks are engaged and the truck body is configured for transit;

at least one quick-disconnect hose fitting configured to disengage the electric power-take-off system at least one hose from the truck body;

at least one of (i) a wiring harness, and (ii) a cable operable for quick disconnect of electrical wiring connecting the electric power-take-off system to the truck body; and a data management system operable to collect real-time data on at least one of (i) hours of operation of the electric power-take-off system, (ii) hours of operation of the existing power-take-off system powered by the internal combustion engine, (iii) fuel savings resulting from increased usage of the electric power-take-off system and reduced usage of the internal combustion engine, and (iv) calculated reduction of greenhouse gas emissions from increased usage of the electric power-take-off system and reduced usage of the existing power-take-off system, wherein the data management system is operable to wirelessly transmit data from the system to a server for transmission to a customer.

19. The system of claim 18, wherein the real-time data collected by the data management system is wirelessly transmitted to a lifecycle management software system.

20. The system of claim 19, wherein the lifecycle management software system and real-time data are operable to reduce vehicle downtime and lower vehicle repair costs.

* * * * *